(12) United States Patent
Tomiyasu

(10) Patent No.: US 9,037,185 B2
(45) Date of Patent: May 19, 2015

(54) COMMUNICATION CONTROL APPARATUS, COMMUNICATION CONTROL METHOD, MOBILE STATION, COMMUNICATION METHOD, AND COMMUNICATION SYSTEM

(71) Applicant: FUJITSU LIMITED, Kawasaki-shi, Kanagawa (JP)

(72) Inventor: Kosuke Tomiyasu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 86 days.

(21) Appl. No.: 14/050,487

(22) Filed: Oct. 10, 2013

(65) Prior Publication Data

US 2014/0162564 A1 Jun. 12, 2014

(30) Foreign Application Priority Data

Dec. 11, 2012 (JP) .................................. 2012-270027

(51) Int. Cl.
*H04B 7/00* (2006.01)
*H04W 24/08* (2009.01)

(52) U.S. Cl.
CPC ................ *H04W 24/08* (2013.01); *Y02B 60/50* (2013.01)

(58) Field of Classification Search
CPC ....... H04W 16/00; H04W 16/04; H04W 28/22
USPC .......... 455/522, 445, 453, 452.2, 67.11, 226.1
See application file for complete search history.

(56) References Cited

U.S. PATENT DOCUMENTS

| 6,983,153 | B2* | 1/2006 | Jain et al. ................... 455/453 |
| 7,016,686 | B2* | 3/2006 | Spaling et al. .............. 455/453 |
| 7,454,222 | B2* | 11/2008 | Huang et al. ................ 455/522 |
| 2003/0039267 | A1* | 2/2003 | Koo et al. .................. 370/465 |
| 2008/0056177 | A1* | 3/2008 | Mori et al. ................. 370/318 |

FOREIGN PATENT DOCUMENTS

| JP | 04-373328 | 12/1992 |
| JP | 2002-051374 | 2/2002 |
| JP | 2004-129119 | 4/2004 |
| JP | 2006-101180 | 4/2006 |

* cited by examiner

*Primary Examiner* — Sonny Trinh
(74) *Attorney, Agent, or Firm* — Fujitsu Patent Center

(57) ABSTRACT

A communication control apparatus includes a processor that is configured to determine a congestion state of uplink communication of a base station; and cause a mobile station that attempts to establish connection to the base station while increasing transmission power stepwise from an initial value, to set the initial value to be a first value, upon determining the congestion state to be a first congestion state and to set the initial value to be a second value that is greater than the first value, upon determining the congestion state to be a second congestion state that is heavier than the first congestion state.

11 Claims, 13 Drawing Sheets

FIG.4

400 — Init_Power DEFINED VALUE TABLE

| Ack RATE α | Init_Power |
|---|---|
| 401 — 95% ≤ α | 0 dBm |
| 402 — 90% ≤ α < 95% | 3 dBm |
| ⋮ | ⋮ |
| 70% ≤ α < 75% | 15 dBm |
| ⋮ | ⋮ |

FIG.5

500 — Init_Power DEFINED VALUE RECORD TABLE

| DATE | DAY OF WEEK | TIME OF DAY | Init_Power |
|---|---|---|---|
| 501 — 10/2 | WEDNESDAY | 3:30 | 0 dBm |
| 10/2 | WEDNESDAY | 7:00 | 9 dBm |
| 10/2 | WEDNESDAY | 10:00 | 0 dBm |
| ⋮ | ⋮ | ⋮ | ⋮ |
| 10/3 | THURSDAY | 3:30 | 6 dBm |
| ⋮ | ⋮ | ⋮ | ⋮ |

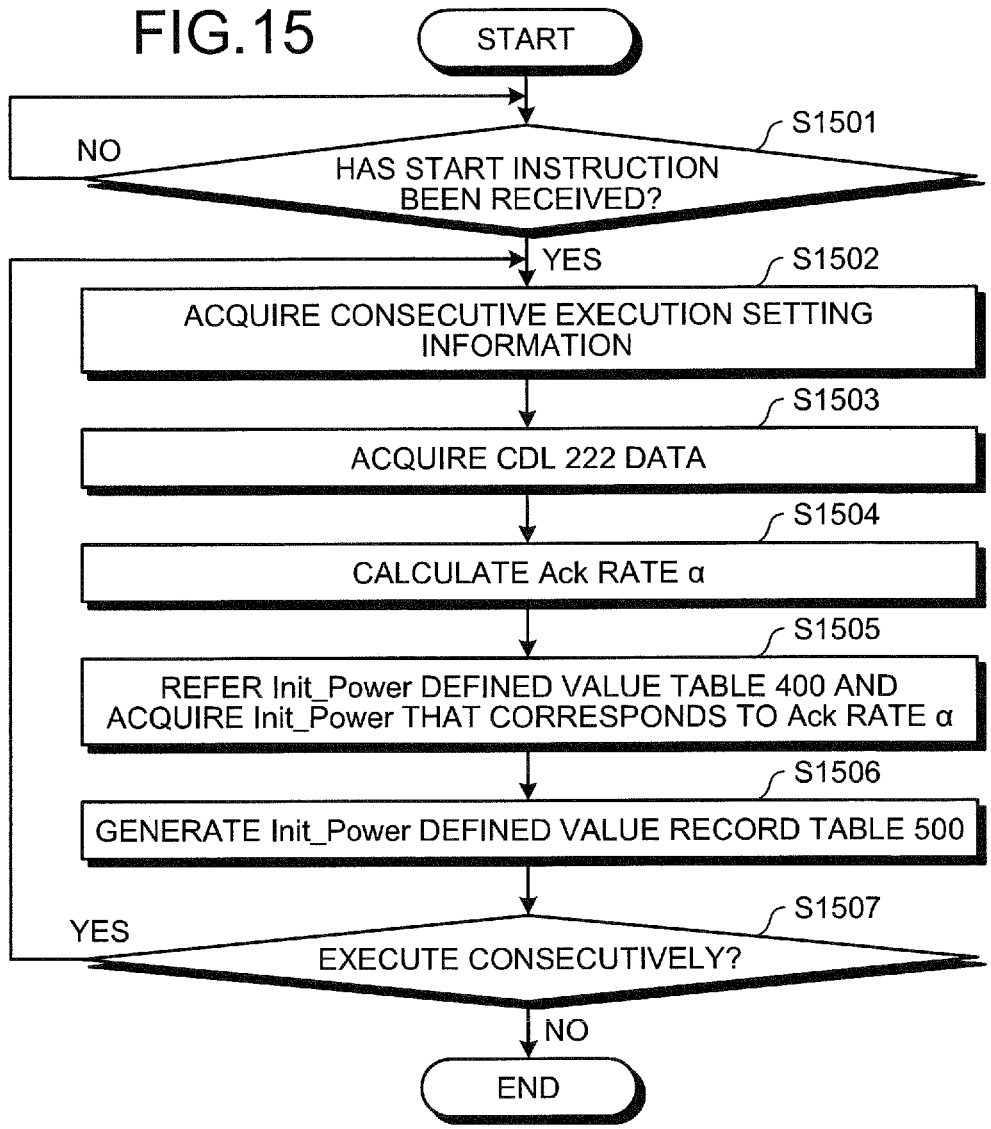

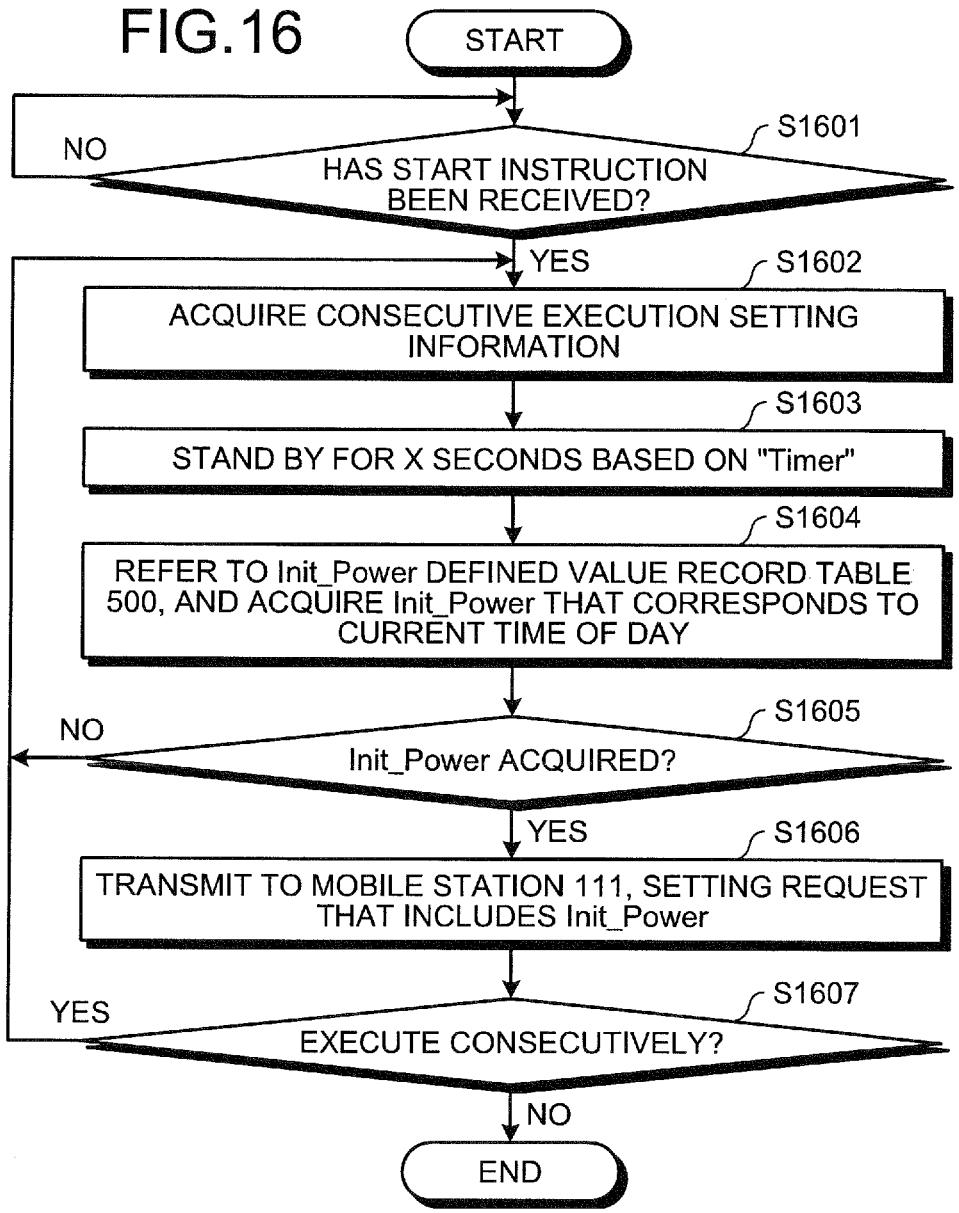

COMMUNICATION CONTROL APPARATUS, COMMUNICATION CONTROL METHOD, MOBILE STATION, COMMUNICATION METHOD, AND COMMUNICATION SYSTEM

CROSS REFERENCE TO RELATED APPLICATIONS

This application is based upon and claims the benefit of priority of the prior Japanese Patent Application No. 2012-270027, filed on Dec. 11, 2012, the entire contents of which are incorporated herein by reference.

FIELD

The embodiments discussed herein are related to a communication control apparatus, a communication control method, a mobile station, a communication method, and a communication system.

BACKGROUND

Conventionally, when a mobile station transmits and receives signals to/from a base station in a mobile communication system, the mobile station attempts to establish a connection with the base station by transmitting radio waves of which the transmission power is increased stepwise from an initial value. The mobile station detects that the mobile station has moved from one location registration area to another by, for example, receiving from a base station an identifier of the location registration area having the base station located therein.

When the mobile station detects that the mobile station has moved from one location registration area to another, the mobile station attempts to establish a connection with the base station to transmit to a switching station via the base station, a registration request requesting the switching station to register an identifier of the location registration area having the mobile station located therein. In this case, when plural mobile stations are carried by a transport facility such as a train, the mobile stations pass together a border of location registration areas and therefore, the mobile stations attempt to establish a connection with a base station and consequently, congestion may be caused in the uplink communication of the base station.

For example, according to an existing technique, when a location registration area changes, a random timer is turned on and location registration is requested using the expiration of the random timer as the trigger (see, e.g., Japanese Laid-Open Patent Publication No. 2002-051374). According to another technique, in a case where a location registration regulation signal from a base station is monitored, when location registration is requested to the base station from a location in the location registration regulation area, the location registration request is regulated at a specific probability and the location registration is requested after standing by for a predetermined time period (see, e.g., Japanese Laid-Open Patent Publication No. H04-373328).

According to another technique, when the reception level of a signal sent from a base station is less than or equal to a first threshold value, the transmission power is set to be higher (see, e.g., Japanese Laid-Open Patent Publication No. 2006-101180). According to another technique, an operation information database of a transport facility is referred to, and when the transport facility to passes through the border of a location registration area, the location registration area of mobile terminals loaded on the transport facility is changed (see, e.g., Japanese Laid-Open Patent Publication No. 2004-129119).

Nonetheless, according to the conventional techniques, when access concentrates at the base station consequent to, for example, a commute period, noise in the uplink band becomes significant and access attempts increase. Therefore, congestion of the communication cannot be suppressed.

SUMMARY

According to an aspect of an embodiment, a communication control apparatus includes a processor that is configured to determine a congestion state of uplink communication of a base station; and cause a mobile station that attempts to establish connection to the base station while increasing transmission power stepwise from an initial value, to set the initial value to be a first value, upon determining the congestion state to be a first congestion state and to set the initial value to be a second value that is greater than the first value, upon determining the congestion state to be a second congestion state that is heavier than the first congestion state.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram of an example of the contents of an Init_Power defined value table 400;

FIG. 5 is a diagram of an example of the contents of an Init_Power defined value record table 500;

FIG. 15 is a flowchart of an example of a procedure for a generation process by the communication control apparatus 130; and FIG. 16 is a flowchart of an example of a procedure for the setting process by the communication control apparatus 130.

DESCRIPTION OF EMBODIMENTS

Embodiments of a communication control apparatus, a communication control method, a mobile station, a communication method, and a communication system will be described in detail with reference to the accompanying drawings.

Figure 1:
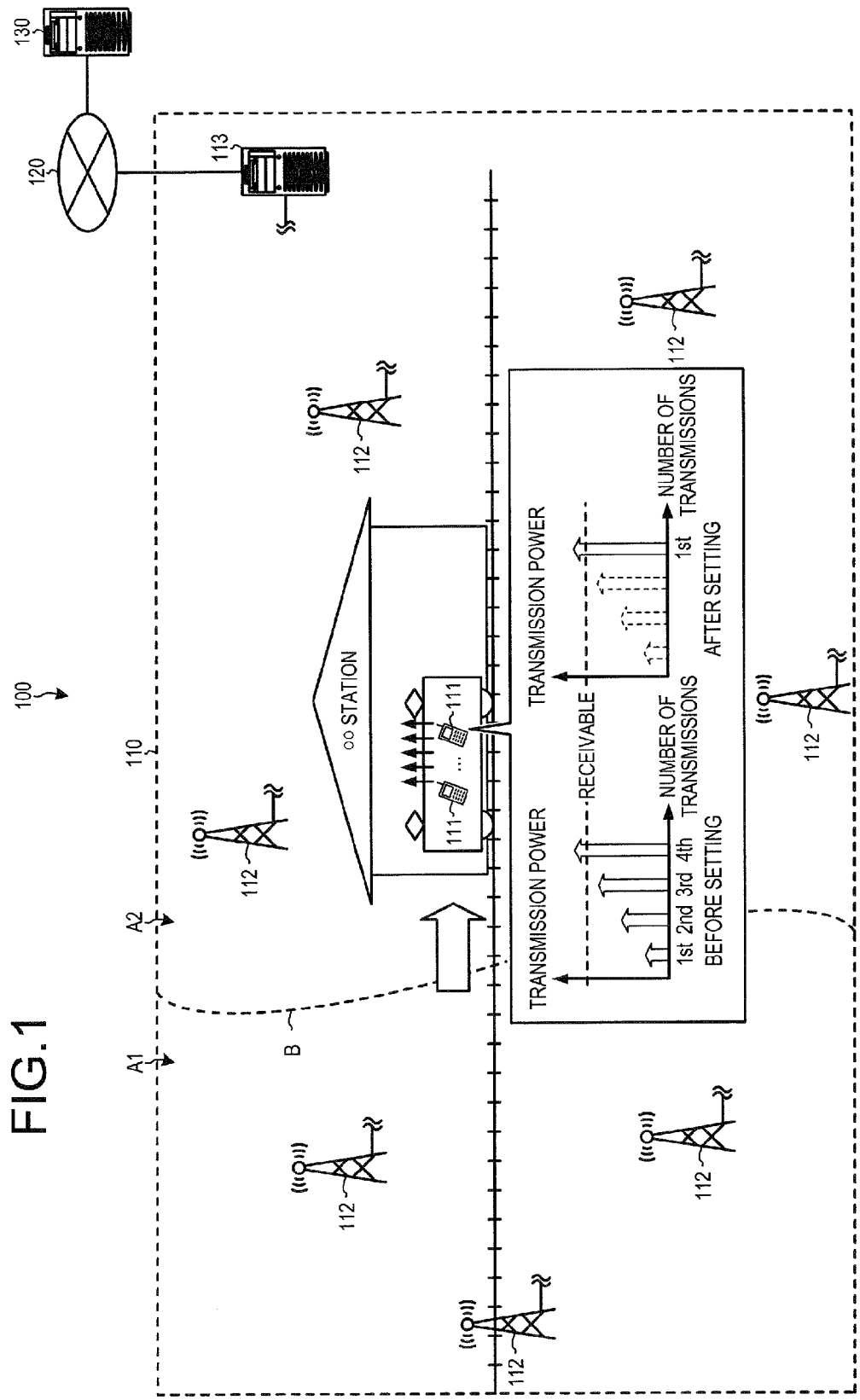
FIG. 1 is a diagram of one example of a communication system 100.

FIG. 1 is a diagram of one example of a communication system 100. In FIG. 1, the communication system 100 is a system that includes a radio access network (RAN) 110 that includes mobile stations 111, base stations 112, and a base station control apparatus 113; a network 120; and a communication control apparatus 130.

Each of the mobile stations 111 is a computer that communicates with the base stations 112 by transmitting and receiving radio waves to/from the base stations 112. The radio wave in this case is shaped by modulation into a waveform that indicates an arbitrary signal. For example, when the mobile station 111 transmits a radio wave to the base station 112, the mobile station 111 transmits the radio waves while increasing stepwise, the transmission power of the radio waves from an initial value thereof and thereby, attempts to establish a connection with the base station 112.

"Connection" used herein refers to a state where, when the mobile station 111 and the base station 112 mutually receive from each other a radio wave, the mobile station 111 and the base station 112 can each regenerate a signal from the received radio wave. In the description below: an expression "a signal can be regenerated from an radio wave" may simply be written as "the radio wave can be received"; and an expression "no signal can be regenerated from an radio wave" may simply be written as "the radio wave cannot be received".

For example, an expression "though the base station 112 receives a radio wave from the mobile station 111, the base station 112 cannot separate the radio wave from noise and cannot regenerate any signal from the radio wave" may be written as "the base 112 cannot receive the radio wave from the mobile station 111".

The base station 112 is an apparatus that communicates with the mobile station 111 by transmitting and receiving radio waves to/from the mobile station 111 located within communication coverage area of the base station 112; is connected to the base station control apparatus 113 by a cable and communicates with the base station control apparatus 113; transmits radio waves within the communication coverage area according to, for example, the control by the base station control apparatus 113; and can receive the radio waves from the mobile station 111 when the intensity of the radio waves arriving from the mobile station 111 at the base station 112 is greater than or equal to a noise floor.

A "noise floor" is, for example, the intensity of noise at the base station 112. The noise floor has a greater value as congestion of uplink communication of the base station 112 increases. In other words, the base station 112 can receive a radio wave from the mobile station 111 when the mobile station 111 transmits the radio wave with a transmission power that enables a radio wave having an intensity greater than or equal to the noise floor to arrive at the base station 112.

The base station control apparatus 113 is an apparatus that is connected to the base station 112 by a cable and that controls the base station 112; communicates with the communication control apparatus 130 through the network 120; and causes, for example, the base station 112 to transmit at specific time intervals an identifier of the location registration area having the base station 112 located therein to the mobile station 111 in the communication coverage area of the base station 112.

For example, the base station control apparatus 113 receives a control command that includes data to be transmitted from the communication control apparatus 130 to the base station 112, and causes the base station 112 to transmit the data to the mobile station 111 in the communication coverage area of the base station 112. In the example of FIG. 1, a signal line connecting the base station control apparatus 113 to the base station 112 is not depicted. The base station control apparatus 113 may be included in the base station 112.

The communication control apparatus 130 is a computer that causes the base station 112 to transmit a setting request to cause the mobile station 111 to set the initial value of the transmission power thereof, to the mobile station 111 in the communication coverage area of the base station 112 and thereby, causes the mobile station 111 in the communication coverage area of the base station 112 to set the initial value of the transmission power thereof. For example, the communication control apparatus 130 transmits the setting request to the base station control apparatus 113 and thereby, causes the base station 112 to transmit the setting request. In this case, the communication control apparatus 130 determines the congestion state of the uplink communication of the base station 112, and causes the mobile station 111 to set a greater value to be the initial value of the transmission power as the uplink communication of the base station 112 suffers heavier congestion.

In the example of FIG. 1, the mobile station 111 sets, for example, "2 dBm" set by the service provider to be the initial value of the transmission power. "dBm" is a unit representing the relative power when the power of 1 mW regarded as 0 dBm. Therefore, when the mobile station 111 transmits a radio wave to the base station 112, the mobile station 111 attempts to establish a connection with the base station 112 while increasing stepwise the transmission power of the transmitted radio waves by, for example, "2 dBm" at a time from an initial value of "2 dBm".

In the example of FIG. 1, the base station 112 suffers uplink congestion and therefore, cannot receive the radio waves of a transmission power that is, for example, lower than "7 dBm" transmitted from the mobile station 111. In other words, when the mobile station 111 transmits a radio wave of the transmission power lower than "7 dBm" to the base station 112, the mobile station 111 cannot establish any connection with the base station 112.

In the example of FIG. 1, the communication control apparatus 130 determines whether the uplink communication of the base station 112 suffers congestion that is heavier than that of a predetermined congestion state. If the communication control apparatus 130 determines that the uplink communication suffers congestion that is lighter than that of the predetermined congestion state, the communication control apparatus 130 causes the base station 112 to transmit to the mobile station 111 in the communication coverage area of the case station 112, a setting request to cause the mobile station 111 to set "2 dBm" defined by the service provider to be the initial value of the transmission power. On the other hand, if the communication control apparatus 130 determines that the uplink communication suffers congestion that is heavier than that of the predetermined congestion state, the communication control apparatus 130 causes the base station 112 to transmit to the mobile station 111 in the communication coverage area of the base station 112, a setting request to cause the mobile station 111 to set "8 dBm", which is higher than "7 dBm", to be the initial value of the transmission power.

In FIG. 1, the congestion state of the uplink communication of the base station 112 is heavier than that of the predetermined congestion state. The communication control apparatus 130 causes the base station 112 to transmit to the mobile station 111 in the communication coverage area, a setting request to cause the mobile station 111 to set "8 dBm" to be the initial value of the transmission power. It is assumed that the mobile station 111 is carried in plural by a transport facility and that the mobile stations 111 move from a location registration area A1 to another location registration area A2. In this case, the mobile station 111 receives the setting request transmitted from the base station 112 together with an identifier of the location registration area A2 transmitted from the base station 112.

The mobile station 111 changes the initial value of the transmission power from "2 dBm" defined by the service provider to the requested "8 dBm", according to the received setting request. Based on the received identifier of the location registration area A2, the mobile station 111 detects that the mobile station 111 has moved from the location registration area A1 to the location registration area A2 and attempts to establish a connection with the base station 112 while increasing stepwise, the transmission power from the initial value "8 dBm". The transmission power is greater than or equal to "7 dBm" in the first attempt to establish a connection with the base station 112 and therefore, the base station 112 can receive the radio wave and the mobile station 111 successfully establishes a connection with the base station 112.

When the mobile station 111 does not change the initial value, the mobile station 111 attempts to establish a connection with the base station 112 while increasing stepwise, the transmission power by "2 dBm" from "2 dBm". Therefore, in the first to the third attempts, the mobile station 111 has to transmit radio waves that are not receivable by the base station 112, each with transmission power less than "7 dBm". In the fourth attempt, the mobile station 111 transmits a radio wave that is receivable by the base station 112 and that has transmission power greater than or equal to "7 dBm", and the mobile station 111 successfully establishes a connection with the base station 112. On the other hand, when the mobile station 111 changes the initial value, the mobile station 111 in the first attempt transmits a radio wave that is receivable by the base station 112 with a transmission power greater than or equal to "7 dBm" and successfully establishes a connection with the base station 112.

As described, the mobile station 111 sets the initial value of the transmission power to be "8 dBm", which is greater than the "2 dBm" defined by the service provider and thereby, can reduce the number of attempts to establish a connection with the base station 112. As a result, the communication control apparatus 130 can reduce the number of radio wave transmissions from the mobile station 111 to the base station 112 and thereby, can suppress the congestion of the uplink communication of the base station 112, and can lower the noise floor at the base station 112 by suppressing interference among radio waves.

The communication control apparatus 130 can reduce the number of radio wave transmissions from the mobile station 111 to the base station 112 and thereby, can reduce the power consumption of the mobile station 111. The communication control apparatus 130 can reduce the number of radio wave transmissions from the mobile station 111 to the base station 112 and thereby, can reduce the time period necessary for successfully establishing a connection with the base station 112.

In the example of FIG. 1, a case has been taken as the example, where the plural mobile stations 111 are carried by the transport facility and pass through the border between the location registration areas and thereby, the uplink communication of the base station 112 suffers the congestion. However, the example is not limited hereto. For example, a case may be taken as an example, where an event is held in a stadium or a concert hall; thereby, the plural mobile stations 111 therein respectively attempt to establish connections with the base station 112; and the uplink communication of the base station 112 suffers congestion. A case may also be taken as an example, where the plural mobile stations 111 of people who have gathered at a shrine to welcome in the new year and attempt to establish the connections to the base station 112 and the uplink communication of the base station 112 suffers congestion. A case may also be taken as an example, where the plural mobile stations 111 attempt to establish connections to the base station 112 consequent to an accident involving the transport facility, etc. and the uplink communication of the base station 112 suffers congestion.

Figure 2:
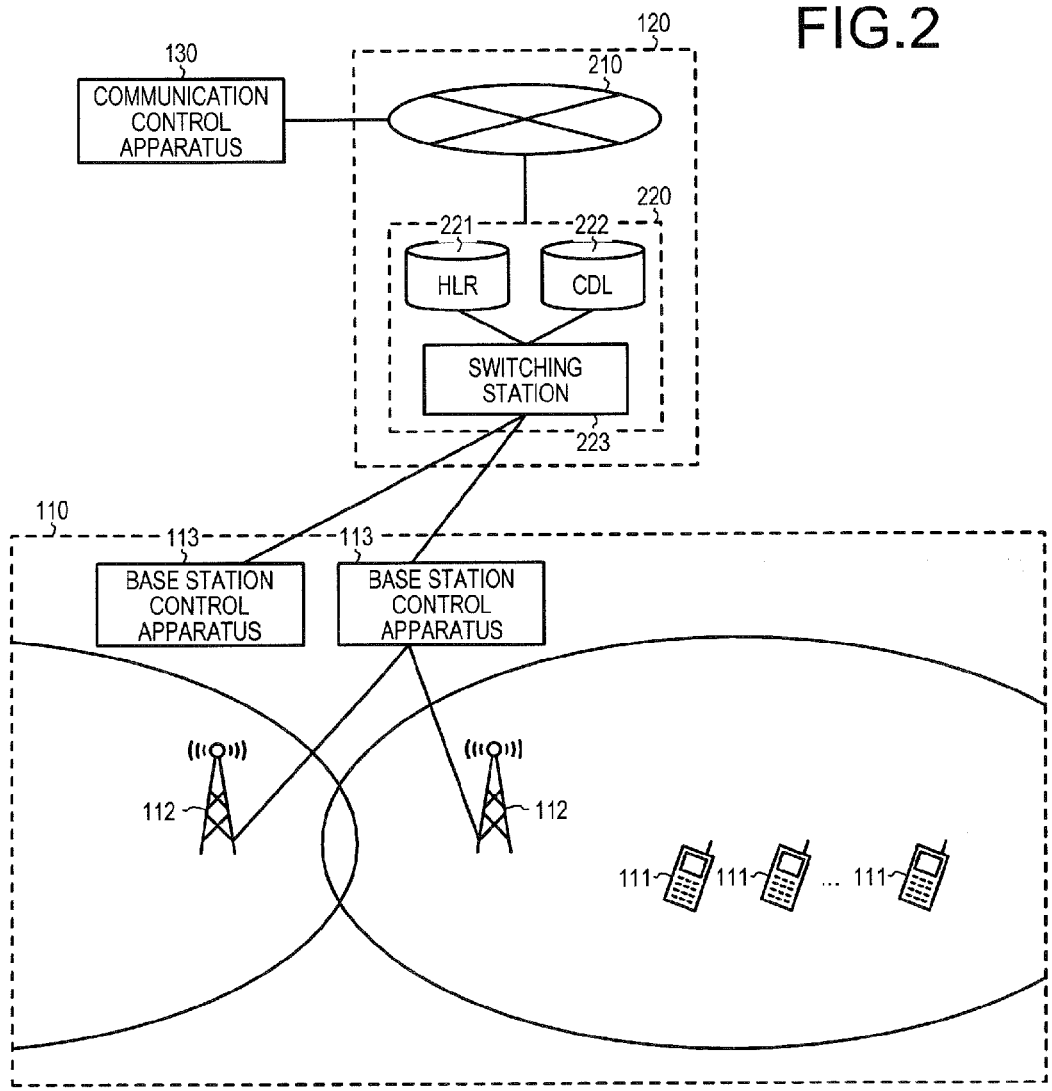
FIG. 2 is a diagram of an example of hardware of the communication system 100.

FIG. 2 is a diagram of an example of hardware of the communication system 100.

In FIG. 2, the communication system 100 is a system that includes the RAN 110 that includes the mobile stations 111, the base stations 112, and the base station control apparatuses 113; a network 120 that includes the Internet 210 and a core network 220; and the communication control apparatus 130.

The mobile stations 111 communicates with the base stations 112 by transmitting and receiving radio waves to/from the base station 112. For example, when a user of the mobile station 111 inputs into the mobile station 111, a transmission request to transmit a radio wave to the base station 112, the mobile station 111 transmits the radio wave to the base station 112. The "transmission request" is, for example, a call request to make a call to another mobile station 111 through the base station 112.

The mobile station 111 receives an identifier of the location registration area transmitted from the base station 112 and thereby, detects that the mobile station 111 has passed through the border between location registration areas. When the mobile station 111 detects that the mobile station 111 has passed through the border between the location registration areas, the mobile station 111 transmits a radio wave to the base station 112 to transmit to a switching station 223, through the base station 112, a registration request to register the location registration area having the mobile station 111 therein. In this case, when the mobile station 111 transmits the radio wave to the base station 112, the mobile station 111 attempts to establish a connection with the base station 112 by transmitting radio waves and increasing stepwise, the transmission power of the radio waves from the initial value.

The base station 112 is an apparatus that communicates with the mobile station 111 by transmitting and receiving radio waves to/from the mobile station 111 located in the communication coverage area of the base station 112; is connected to the base station control apparatus 113 by a cable; and communicates therewith. The base station 112 transmits, for example, to the mobile station 111 in the communication coverage area of the base station 112, the identifier of the location registration area having the base station 112 therein at specific time intervals according to the control of the base station control apparatus 113.

The base station control apparatus 113 is connected to the base station 112 by a cable; controls the base station 112; and communicates with the communication control apparatus 130 through the network 120. For example, the base station control apparatus 113 causes the base station 112 to transmit an identifier of the location registration area having the base station 112 therein at the specific time intervals, to the mobile station 111 in the communication coverage area of the base station 112; receives a control command from the communication control apparatus 130; and causes the base station 112 to transmit data to be transmitted by the base station 112, to the mobile station 111 in the communication coverage area of the base station 112.

The network 120 is a communication network that connects the communication control apparatus 130 and the base station 112 to each other. The Internet 210 is a communication network that connects the communication control apparatus 130 and the core network 220 to each other. The core network 220 is a communication network that connects the Internet 210 and the base station control apparatus 113 to each other.

The core network 220 includes the switching station 223, a home location register (HLR) 221, and a call detail log (CDL) 222. The switching station 223 is a computer that controls the communication between the mobile station 111 and the communication control apparatus 130. The HLR 221 is a database that stores the telephone number specific to the mobile station 111 and an identifier thereof. The CDL 222 is a log that stores radio parameters and radio traffic information of the base station 112.

The communication control apparatus 130 causes the base station 112 to transmit to the mobile station 111, a setting request to cause the mobile station 111 to set the initial value of the transmission power and thereby, causes the mobile station 111 in the communication coverage area of the base station 112 to set the initial value of the communication coverage area. The communication control apparatus 130 determines the congestion state of the uplink communication of the base station 112, and causes the mobile station 111 to set a greater value to be the initial value of the transmission power as the uplink communication of the base station 112 suffers heavier congestion. For example, the communication control apparatus 130 transmits a setting request to the base station control apparatus 113 and thereby, causes the base station control apparatus 113 to control the base station 112 and thereby, causes the base station 112 to transmit the setting request to the mobile station 111 in the communication coverage area thereof. The communication control apparatus 130 may be integrated into the switching station 223.

Figure 3:
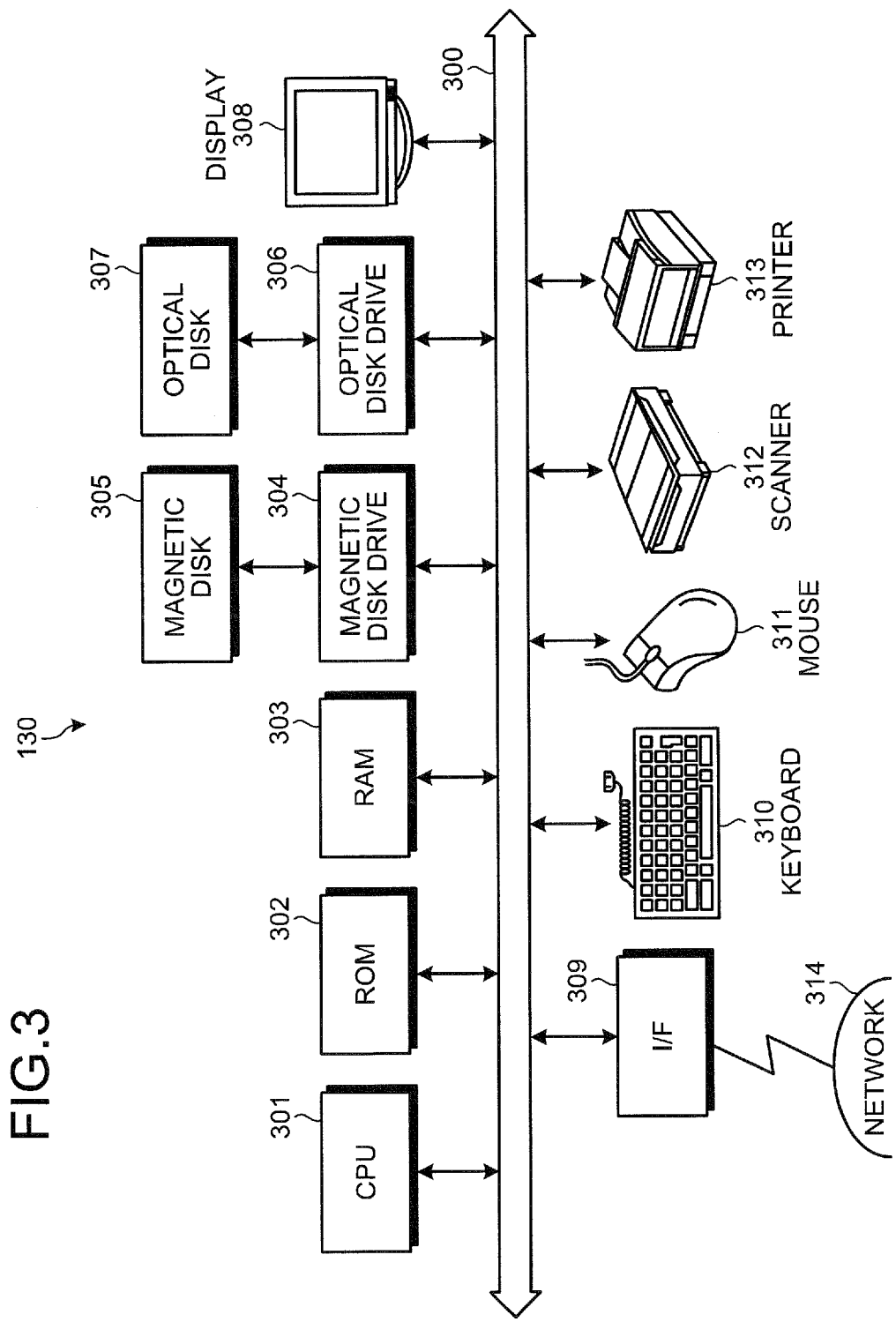
FIG. 3 is a block diagram of an example of a hardware configuration of a communication control apparatus 130 according to an embodiment.

FIG. 3 is a block diagram of an example of a hardware configuration of the communication control apparatus 130 according to the embodiment.

As depicted in FIG. 3, the communication control apparatus 130 includes a central processing unit (CPU) 301, a read-only memory (ROM) 302, a random access memory (RAM) 303, a magnetic disk drive 304, a magnetic disk 305, an optical disk drive 306, an optical disk 307, a display 308, an interface (I/F) 309, a keyboard 310, a mouse 311, a scanner 312, and a printer 313, respectively connected by a bus 320.

The CPU 301 governs overall control of the communication control apparatus 130. The ROM 302 stores therein programs such as a boot program. The RAM 303 is used as a work area of the CPU 301. The magnetic disk drive 304, under the control of the CPU 301, controls the reading and writing of data with respect to the magnetic disk 305. The magnetic disk 305 stores therein data written under control of the magnetic disk drive 304.

The optical disk drive 306, under the control of the CPU 301, controls the reading and writing of data with respect to the optical disk 307. The optical disk 307 stores therein data written under control of the optical disk drive 306, the data being read by a computer.

The display 308 displays, for example, data such as text, images, functional information, etc., in addition to a cursor, icons, and/or tool boxes. A liquid crystal display, a plasma display, etc., may be employed as the display 308.

The I/F 309 is connected to a network 314 such as a local area network (LAN), a wide area network (WAN), and the Internet through a communication line and is connected to other apparatuses through the network 314. The I/F 309 administers an internal interface with the network 314 and controls the input/output of data from/to external apparatuses. For example, a modem or a LAN adaptor may be employed as the I/F 309.

The keyboard 310 includes, for example, keys for inputting letters, numerals, and various instructions and performs the input of data. Alternatively, a touch-panel-type input pad or numeric keypad, etc. may be adopted. The mouse 311 is used to move the cursor, select a region, or move and change the size of windows. A track ball or a joy stick may be adopted provided each respectively has a function similar to a pointing device.

The scanner 312 optically reads an image and takes in the image data into the design support apparatus. The scanner 312 may have an optical character reader (OCR) function as well. The printer 313 prints image data and text data. The printer 313 may be, for example, a laser printer or an ink jet printer. Any one or more among the optical disk drive 306, the optical disk 307, the display 308, the keyboard 310, the mouse 311, the scanner 312, and the printer 313 may be omitted from the configuration.

An example of the contents of an Init_Power defined value table 400 will be described with reference to FIG. 4. The Init_Power defined value table 400 is implemented by, for example, the ROM 302, the magnetic disk 305, or the optical disk 307.

FIG. 4 is a diagram of an example of the contents of the Init_Power defined value table 400. As depicted in FIG. 4, the Init_Power defined value table 400 has an Init_Power field correlated with an Ack rate field, and with the setting of information into the Init_Power field for each Ack rate $\alpha$, stores the information as records.

The Ack rate field has the range of the Ack rate $\alpha$. The "Ack rate $\alpha$" is an example of information indicating the degree of the congestion of the uplink communication of the base station 112 and is, for example, a rate at which acknowledgements are transmitted from the mobile stations 111 to the base station 112 when the base station 112 transmits a radio wave to the mobile stations 111 in the communication coverage area thereof. A greater value of the Ack rate $\alpha$ indicates a lower degree of congestion.

The Init_Power field stores the "Init_Power", which is a parameter to determine the value to be set by the mobile station 111 as the initial value of the transmission power when the Ack rate stored in the Ack rate field is $\alpha$. The Init_Power is also a parameter to determine the value of the transmission power to be used in the second and subsequent attempts to establish a connection with the base station 112. For example, the transmission power is determined by substituting the Init_Power into Eq. (1) below.

$$\text{Transmission power} = \text{Offset\_Power} - \text{Rx\_Power} + \text{Init\_Power} + (\text{number of attempts} \times \text{increased power amount}) \quad (1)$$

Offset_Power: the defined value (fixed value)
Rx_Power: Reception power at a portable terminal In Eq. (1), the initial value of the transmission power becomes greater as the Init_Power becomes higher. The Init_Power field may store a value that is to be set by the mobile station 111 as the initial value of the transmission power when the Ack rate stored in the Ack rate field is $\alpha$.

For example, a record 401 has the range "95%≤$\alpha$" of the Ack rate $\alpha$ and the Init_Power of "0 dBm" stored therein correlating these with each other. For example, a record 402 has the range "90≤$\alpha$≤95%" of the Ack rate $\alpha$ and the Init_Power of "3 dBm" stored therein correlating these with each other.

An example of the contents of the Init_Power defined value record table 500 will be described with reference to FIG. 5. The Init_Power defined value record table 500 is implemented by, for example, the ROM 302, the magnetic disk 305, or the optical disk 307.

FIG. 5 is a diagram of an example of the contents of the Init_Power defined value record table 500. As depicted in FIG. 5, the Init_Power defined value record table 500 has a day of week field, a time of day field, and an Init_Power field correlating these with a date field, and with the setting of information into each of the fields correlated with each date, stores the information as records.

The date field stores the date. The day of week field stores the day of week. The time of day field stores the time of day.

The Init_Power field stores a parameter to determine the value to be set by the mobile station 111 as the initial value of the transmission power when the time of the day of the date indicated by the date field, the day of week field, and the time of day field arrive. In the example depicted in FIG. 5, the initial value can be increased as the value of the parameter becomes greater. The Init_Power field may store the value that is to be set by the mobile station 111 as the initial value of the transmission power. For example, a record 501 stores a time of day "3:30" on the day of week "Wednesday" of the date "October 2nd" and the Init_Power of "0 dBm", correlating the first three fields with the last one field.

The Init_Power defined value record table 500 may be created by a user of the communication control apparatus 130, or may automatically be generated by the communication control apparatus 130.

Figure 6:
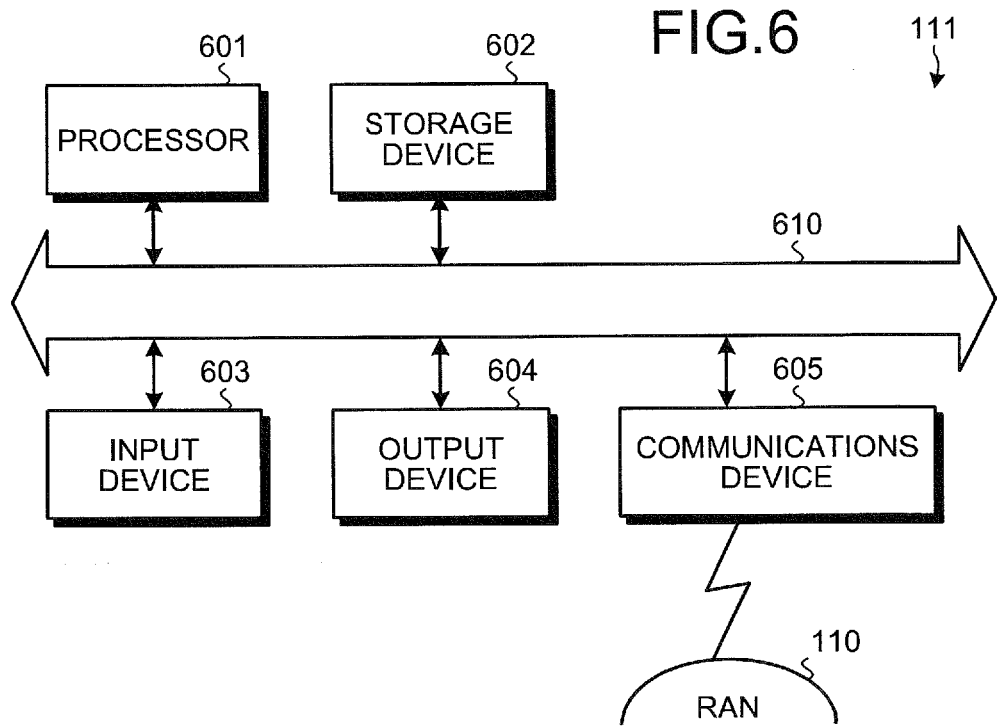
FIG. 6 is a block diagram of an example of a hardware configuration of a mobile station 111.

FIG. 6 is a block diagram of an example of a hardware configuration of the mobile station 111. In FIG. 6, the mobile station 111 includes a processor 601, a storage device 602, an input device 603, an output device 604, and a communications device 605, respectively connected by a bus 610.

The processor 601 governs overall control of the mobile station 111; and reads data in the storage device 602 and writes data to be an execution result into the storage device 602 by executing an operating system (OS) stored in the storage device 602.

The storage device 602 is a ROM, a RAM, a flash memory, a magnetic disk drive, etc.; serves as a work area for the processor 601; and stores various types of data including data acquired by the execution of the OS.

The input device 603 is an interface that inputs the various types of data by a user operation using a keyboard, a mouse, a touch panel, etc. The output device 604 is an interface that outputs data according to an instruction of the processor 601, and can be a display or a printer.

The communications device 605 includes an antenna; communicates with the base station 112 by transmitting and receiving radio waves using the antenna; and is an interface that, via the base station 112, receives data from an external source and transmits data to an external destination.

The mobile station 111 can be, for example, user equipment (UE) such as a smartphone, a personal handy-phone system (PHS), or a tablet terminal.

An example of a functional configuration of the communication control apparatus 130 will be described with reference to FIG. 7.

Figure 7:
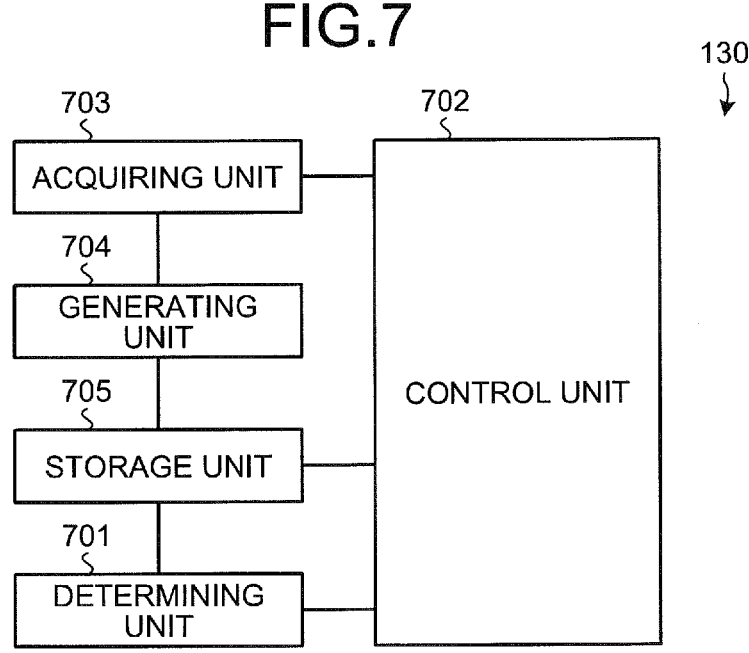
FIG. 7 is a block diagram of a functional configuration of the communication control apparatus 130.

FIG. 7 is a block diagram of a functional configuration of the communication control apparatus 130. The communication control apparatus 130 includes a determining unit 701, a control unit 702, an acquiring unit 703, a generating unit 704, and a storage unit 705.

Functions of the determining unit 701, the control unit 702, the acquiring unit 703, the generating unit 704, and the storage unit 705 are implemented, for example, by causing the CPU 301 to execute programs stored in the storage device 602 such as the ROM 302, the RAM 303, the magnetic disk 305, or the optical disk 307 depicted in FIG. 3; or using the I/F 309.

As an operation of the communication control apparatus 130, for example, is an operation to determine the current congestion state of the uplink communication of the base station 112 and cause the base station 112 to set the initial value of its transmission power corresponding to the result of the determination. As another operation of the communication control apparatus 130 is, for example, an operation to cause the base station 112 to set the initial value of the transmission power corresponding to the time of day.

In the description below, the operation to cause the base station 112 to set the initial value of the transmission power according to the result of the determination may be denoted as "operation example 1" and the operation to cause the base station 112 to set the initial value of the transmission power corresponding to the time of day may be written as "operation example 2".

Operation of the communication control apparatus 130 will be described, in the operation example 1 to cause the base station 112 to set the initial value of the transmission power according to the result of the determination.

The determining unit 701 determines to which one of plural congestion states, the congestion state of the uplink communication of the base station 112 corresponds. The acquiring unit 703 acquires, for example, the current number of Acks, etc. at the base station 112 and the generating unit 704 calculates the Ack rate. The determining unit 701 determines which one of the Ack rate ranges in the Ack rate field of the Init_Power defined value table 400 includes the acquired Ack rate. The data acquired by the acquiring unit 703, the result of the calculation by the generating unit 704, and the result of the determination by the determining unit 701 are stored to a storage area such as, for example, the RAM 303, the magnetic disk 305, or the optical disk 307.

Thus, the control unit 702 can identify the Init_Power by referring to the Init_Power field of the Init_Power defined value table 400 that corresponds to the range of the Ack rate determined by the determining unit 701; and can transmit to the mobile station 111, a setting request that includes the Init_Power to determine the initial value to be set by the mobile station 111 as the initial value of the transmission power.

The control unit 702 causes the mobile station 111 to set the initial value to be greater as the degree of congestion of the congestion state determined by the determining unit 701 increases; causes the mobile station 111 that attempts to establish connection with the base station 112 to increase stepwise, the transmission power from the initial value, to set a first value to be the initial value if the determining unit 701 determines that the congestion state is a first congestion state; and causes the mobile station 111 to set a second value that is greater than the first value to be the initial value if the determining unit 701 determines that the congestion state is a second congestion state whose congestion is heavier than that of the first congestion state.

For example, the control unit 702 identifies the Init_Power by referring to the Init_Power field of the Init_Power defined value table 400 that corresponds to the range of the Ack rate determined by the determining unit 701. The control unit 702 transmits to the base station control apparatus 113, a setting request that includes the identified Init_Power and the base station control apparatus 113 controls the base station 112 to transmit the setting request to the mobile station 111 in the communication coverage area.

Thus, the control unit 702 can cause the mobile station 111 to set the initial value to be greater as the degree of congestion of the congestion state of the uplink communication increases. As a result, the control unit 702 is able to reduce the number of transmissions of the radio waves from the mobile station 111 to the base station 112, suppress the congestion of the uplink communication of the base station 112, and reduce the noise floor at the base station 112 by suppressing the interference among the radio waves. The control unit 702 is able to reduce the number of transmissions of the radio waves from the mobile station 111 to the base station 112 and reduce the power consumption of the mobile station 111.

An operation of the communication control apparatus 130 will be described in the operation example 2 to cause the base station 112 to set the initial value of the transmission power corresponding to the time of day.

The acquiring unit 703 acquires information indicating the degree of congestion of the uplink communication for each time of day. The "information indicating the degree of congestion" is, for example, the number of Acks. For example, the acquiring unit 703 acquires the number of Acks from "7:00 to 9:00" on "Monday" on "November 5th" and acquires the Ack rate "70%" calculated by the generating unit 702. The data acquired by the acquiring unit 703 and the Ack rate calculated by the generating unit 702 are stored to a storage area such as, for example, the RAM 303, the magnetic disk 305, and the optical disk 307. Thereby, the acquiring unit 703 is able to identify the time of day and the degree to which the uplink communication of the base station 112 suffers congestion.

The generating unit 704 generates based on not only the calculation of the Ack rate but also on the information acquired by the acquiring unit 703, correlation information that correlates the time of day and values that increase as the degree of the congestion of the uplink communication increases. The "correlation information" is, for example, the information recorded in each of the records of the Init_Power defined value record table 500.

For example, the generating unit 704 refers to the Ack rate "70%" from "7:00 to 9:00" on "Monday" on "November 5th" acquired by the acquiring unit 703 and estimates the Ack rate acquired one week thereafter as "70%" for "7:00 to 9:00" on "Monday" on "November 12th". The generating unit 704 refers to the Init_Power defined value table 400 and acquires the value "15 dBm" of Init_Power field that corresponds to the Ack rate field including the Ack rate "70%".

The generating unit 704 generates information that correlates "7:00 to 9:00" on "Monday" on "November 5th" with the value "15 dBm" of the Init_Power field. Thus, the generating unit 704 is able to determine the value to be set by the mobile station 111 as the initial value of the transmission power for each time of day.

The storage unit 705 stores the correlation information that is generated by the generating unit 704. The storage unit 705 is, for example, the Init_Power defined value record table 500 and stores the information generated by the generating unit 704 as records. Thus, the control unit 702 is able to identify the value to be set by the mobile station 111 as the initial value of the transmission power by referring to the information stored in the storage unit 705.

The control unit 702 refers to the correlation information stored in the storage unit 705 and causes the mobile station 111 to set an initial value that corresponds to the current time of day to be the initial value of the transmission power. In this case, the acquiring unit 703 acquires correlation information correlating, for example, the first value of the transmission power with a first time of day and correlating the second value that is greater than the first value with a second time of day that is different from the first time of day.

The control unit 702 refers to the correlation information acquired by the acquiring unit 703 and causes the mobile station 111 that attempts to establish a connection with the base station 112 to increase stepwise, the transmission power from the initial value, and to set the value corresponding to the current time of day to be the initial value. The "first time of day" is the time of day when the uplink communication of the base station 112 suffers the first congestion state. The "second time of day" is the time of day when the uplink communication suffers the second congestion state that is heavier than the first congestion state. For example, the control unit 702 transmits to the mobile station 111, the setting request that includes the parameter for the mobile station 111 to determine the initial value and thereby, the control unit 702 causes the mobile station 111 to set the initial value.

Thus, the control unit 702 causes the mobile station 111 to set a greater value to be the initial value as the degree of congestion of the congestion state of the uplink communication increases. As a result, the control unit 702 is able to reduce the number of transmission sessions of the radio waves from the mobile station 111 to the base station 112, suppress the congestion of the uplink communication of the base station 112, and reduce the noise floor at the base station 112 by suppressing the interference among the radio waves. The control unit 702 is able to reduce the number of transmissions of the radio waves from the mobile station 111 to the base station 112 and to reduce the power consumption of the mobile station 111.

The control unit 702 may cause the mobile station 111 to set the second value to be the initial value of the transmission power and, after a predetermined time period elapses, may cause the mobile station 111 to set the second value to be the initial value. Thus, even when the mobile station 111 leaves the communication coverage area of the base station 112, the control unit 702 can cause the mobile station 111 to change the initial value of the transmission power back to the value defined by the service provider after a specific time period elapses.

Figure 8:
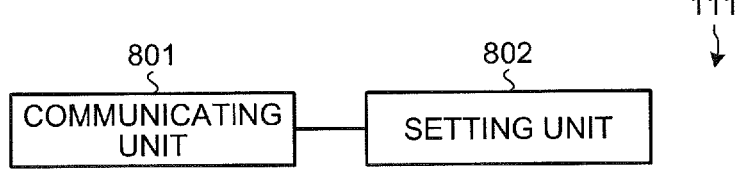
FIG. 8 is a block diagram of a functional configuration of the mobile station 111.

An example of a functional configuration of the mobile station 111 will be described with reference to FIG. 8. FIG. 8 is a block diagram of a functional configuration of the mobile station 111. The mobile station 111 includes a communicating unit 801 and a setting unit 802. Functions of the communicating unit 801 and the setting unit 802 are implemented by, for example, causing the processor 601 to execute programs stored in the storage device 602 depicted in FIG. 6 or by using the communications device 605.

The communicating unit 801 attempts to establish a connection with the base station 112 while increasing stepwise, the transmission power from the initial value. For example, the communicating unit 801 transmits a radio wave to the base station 112, increases stepwise the transmission power of the radio wave from the initial value and, when the base station 112 is able to receive the radio wave, is connected to the base station 112. Thus, the communicating unit 801 can communicate with the base station 112.

The setting unit 802 sets the initial value according to the control of the communication control apparatus 130. For example, the setting unit 802 receives a setting request that the communication control apparatus 130 causes the base station 112 to transmit in the operation examples 1 and 2; substitutes the Init_Power included in the received setting request in Eq. (1); and thereby, sets the initial value of the transmission power.

Thus, the mobile station 111 is able to reduce the number of transmissions of the radio waves from the mobile station 111 to the base station 112 and thereby, is able to suppress the congestion of the uplink communication of the base station 112 and to reduce the noise floor at the base station 112 by suppressing interference among the radio waves. The mobile station 111 is able to reduce the number of transmissions of the radio waves from the mobile station 111 to the base station 112 and to reduce the power consumption of the mobile station 111.

A specific example of the operation example 1 of the communication control apparatus 130 will be described with reference to FIGS. 9 to 11.

Figure 9:
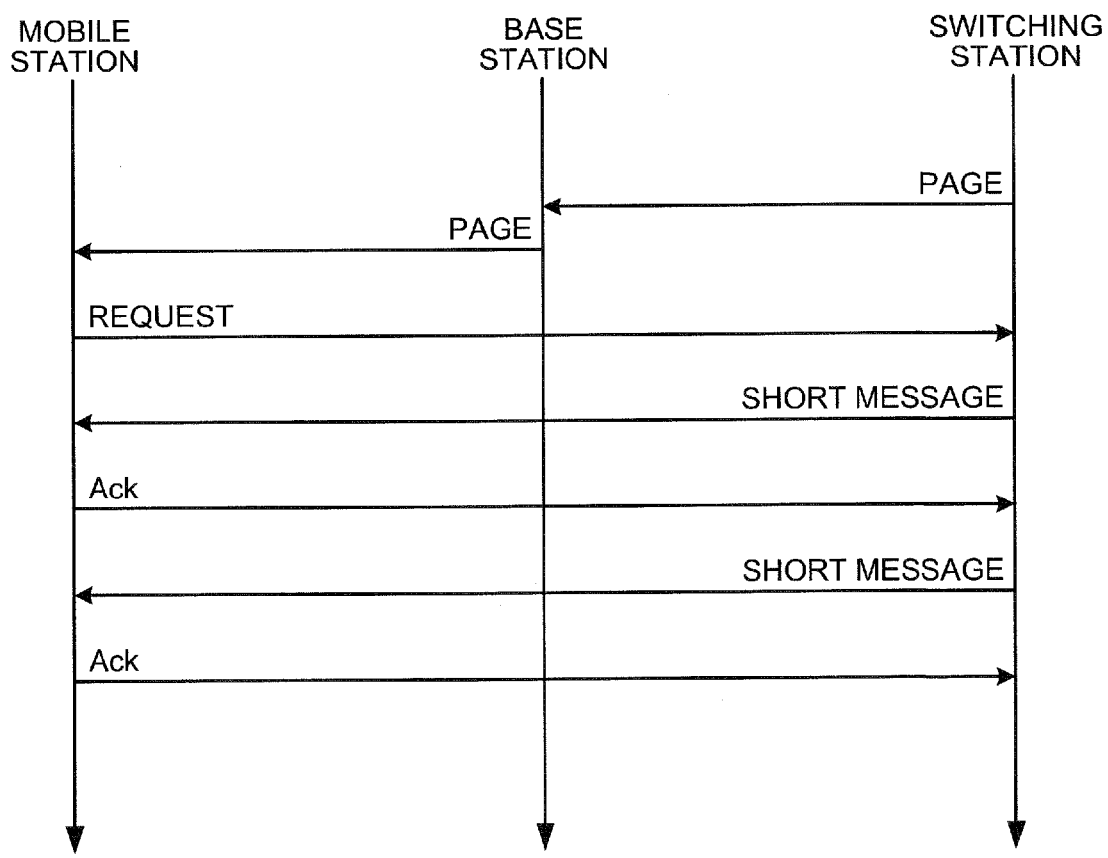
FIG. 9 is a diagram of a specific example of reception of a short message by the mobile station 111.

FIG. 9 is a diagram of a specific example of reception of a short message by the mobile station 111. In FIG. 9, the switching station 223 pages the mobile station 111 located in the location registration area, via the base station 112. The mobile station 111 receives the paging and determines whether a short message addressed to the mobile station 111 is present.

If the mobile station 111 determines that a short message addressed thereto is present, the mobile station 111 transmits, via the base station 112, a request to the switching station 223 to receive the short message. The switching station 223 receives the request and transmits the short message to the mobile station 111, via the base station 112. The mobile station 111 receives the short message and transmits an Ack to the switching station 223, via the base station 112. The switching station 223 stores into the CDL 222, the number of pages and the number of requests and Acks transmitted from the mobile station 111.

Figure 10:
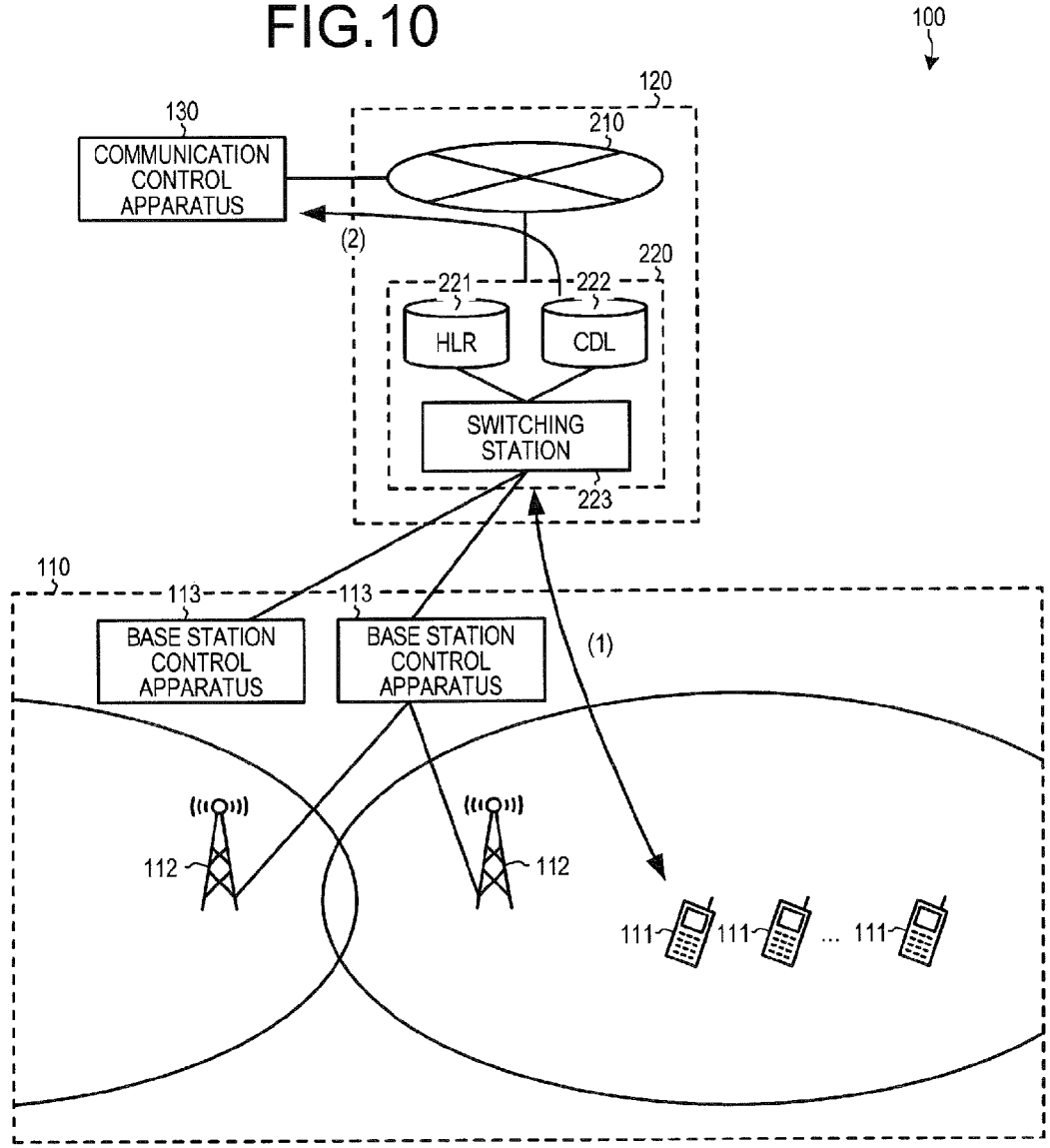
FIGS. 10 and 11 are explanatory diagrams of the specific example of an operation example 1 of the communication control apparatus 130.
Figure 11:
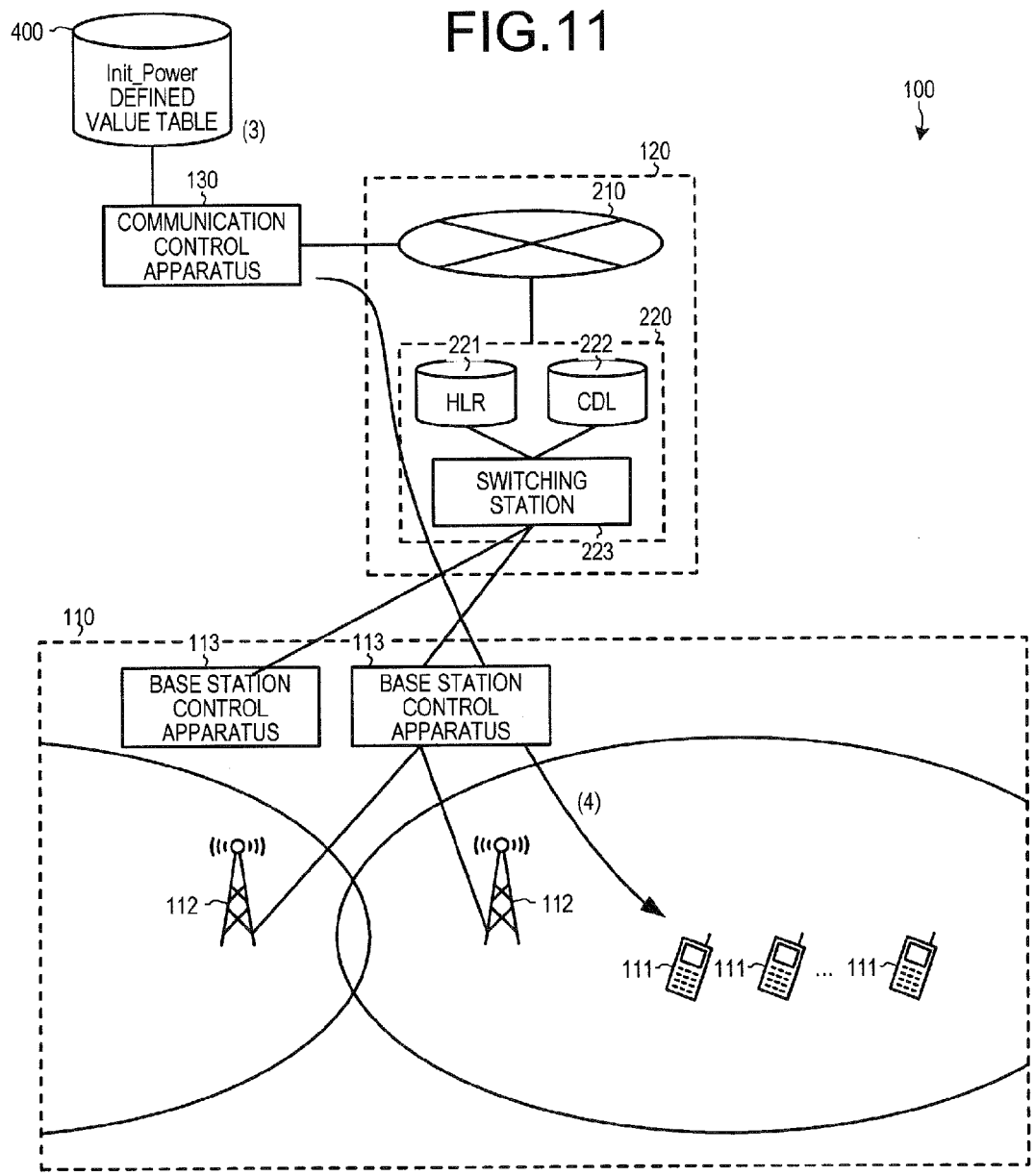

FIGS. 10 and 11 are explanatory diagrams of the specific example of the operation example 1 of the communication control apparatus 130. In FIG. 10, (1) the switching station 223 communicates with the mobile station 111 and stores into the CDL 222, the number of pages from the switching station 223 and the number of requests and Acks transmitted from the mobile station 111, as depicted in FIG. 9.

(2) The communication control apparatus 130 acquires from the switching station 223, the number of pages from the switching station 223 and the number of requests and Acks transmitted from the mobile station 111 that are stored in the CDL 222, and calculates the Ack rate α as information indicating the degree of congestion.

For example, the communication control apparatus 130 calculates the Ack rate α as (the number of requests and Acks)/(the number of pages)×100. Thus, the communication control apparatus 130 is able to determine the congestion state of the base station 112. The description will progress to that with reference to FIG. 11.

In FIG. 11, (3) the communication control apparatus 130 acquires the Init_Power to be included in the setting request transmitted to the mobile station 111 that is in the communication coverage area of the base station 112, based on the Ack rate α calculated at (2). For example, when an Ack rate α of "70%" is calculated at (2), the communication control apparatus 130 refers to the Init_Power defined value table 400 and acquires an Init power of "15 dBm".

(4) The communication control apparatus 130 transmits to the base station control apparatus 113, the setting request including the "15 dBm" that is the acquired Init_Power and the base station control apparatus 113 controls the base station 112 to transmit the setting request to the mobile station 111 that is in the communication coverage area. The mobile station 111 receives the setting request, substitutes into Eq. (1), the Init_Power included in the setting request and thereby, sets the initial value of the transmission power.

Thus, the communication control apparatus 130 can cause the mobile station 111 to set the initial value to be greater as the degree of congestion of the current congestion state of the uplink communication of the base station 112 increases. As a result, the communication control apparatus 130 is able to reduce the number of transmissions of the radio waves from the mobile station 111 to the base station 112 and thus, is able to suppress the congestion of the uplink communication of the base station 112 and reduce the noise floor of the base station 112 by suppressing interference among the radio waves. The communication control apparatus 130 is able to reduce the number of transmissions of the radio waves from the mobile station 111 to the base station 112 and thereby, is able to reduce the power consumption of the mobile station 111.

For example, the communication control apparatus 130 suppresses the congestion of the uplink communication when plural mobile stations 111 carried by a transport facility, pass through the border between location registration areas, and respectively establish a connection with the base station 112. The communication control apparatus 130 can also suppress the congestion of the uplink communication when plural mobile stations 111 respectively establish a connection with the base station 112 consequent to an accident of the transport facility, etc.

In other words, even when it is difficult to estimate in advance the time of day when the base station 112 may suffer congestion, the communication control apparatus 130 can determine in real time the congestion state of the base station 112 and when the uplink communication of the base station 112 suffers congestion, can suppress the congestion of the uplink communication.

An example of a procedure for a basic setting process by the communication control apparatus 130 will be described with reference to FIG. 12. The basic setting process by the communication control apparatus 130 is a process corresponding to the operation example 1.

Figure 12:
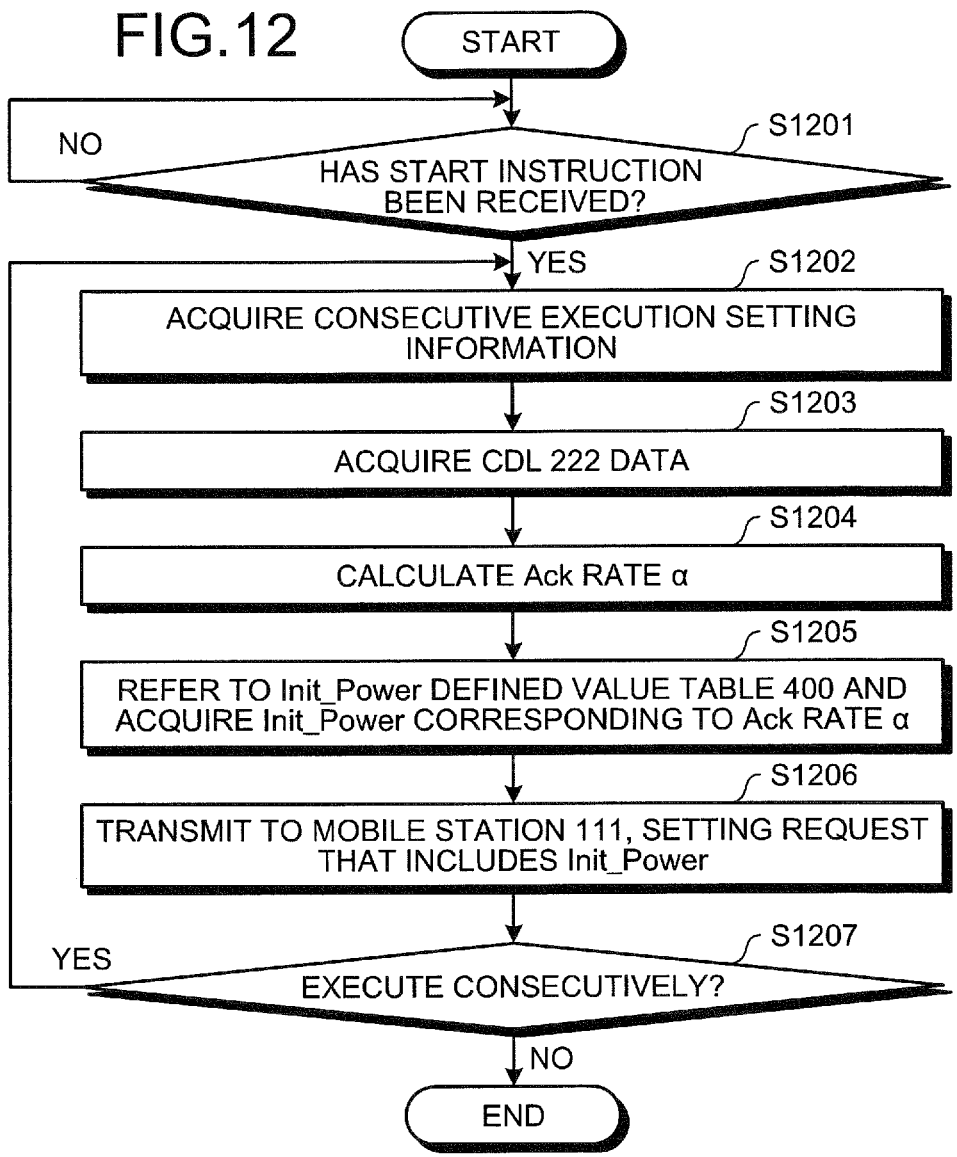
FIG. 12 is a flowchart of the example of a procedure for a basic setting process by the communication control apparatus 130.

FIG. 12 is a flowchart of the example of the procedure for the basic setting process by the communication control apparatus 130. As depicted in FIG. 12, the communication control apparatus 130 determines whether the communication control apparatus 130 has received a start instruction for the basic setting process (step S1201). If the communication control apparatus 130 determines that the communication control apparatus 130 has received no start instruction for the basic setting process (step S1201: NO), the communication control apparatus 130 returns to the process at step S1201.

On the other hand, if the communication control apparatus 130 determines that the communication control apparatus 130 has received a start instruction for the basic setting process (step S1201: YES), the communication control apparatus 130 acquires consecutive execution setting information (step S1202). The "consecutive execution setting information" is, for example, information indicating whether the basic setting process is to be executed consecutively, and is stored in the storage area such as the RAM 303. The communication control apparatus 130 acquires data in the CDL 222 (step S1203) and calculates the Ack rate α from the data in the CDL 222 (step S1204).

The communication control apparatus 130 refers to the Init_Power defined value table 400 and acquires the Init_Power corresponding to the Ack rate α (step S1205). The communication control apparatus 130 transmits to the mobile station 111, a setting request that includes the Init_Power (step S1206).

The communication control apparatus 130 refers to the consecutive execution setting information and determines whether the basic setting process is to be executed consecutively (step S1207). If the communication control apparatus 130 determines that the basic setting process is to be executed consecutively (step S1207: YES), the communication control apparatus 130 returns to the process at step S1202.

On the other hand, when the communication control apparatus 130 determines that the basic setting process is not consecutively executed (step S1207: NO), the communication control apparatus 130 causes the basic setting process to come to an end. Thus, the communication control apparatus 130 can cause the mobile station 111 to set the initial value of the transmission power.

A specific example of the operation example 2 of the communication control apparatus 130 will be described with reference to FIGS. 13 and 14.

Figure 13:
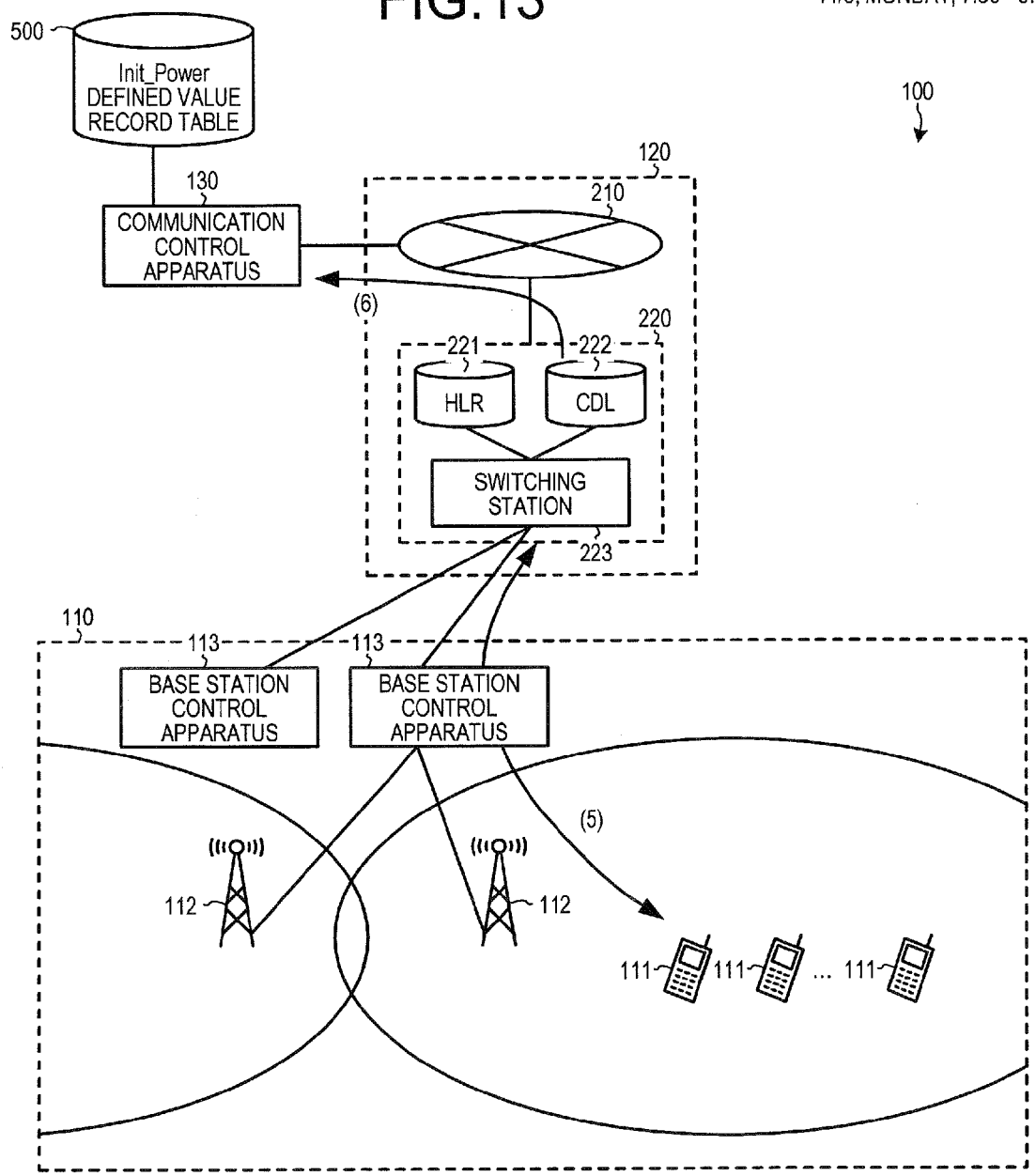
FIGS. 13 and 14 are explanatory diagrams of a specific example of an operation example 2 of the communication control apparatus 130.
Figure 14:
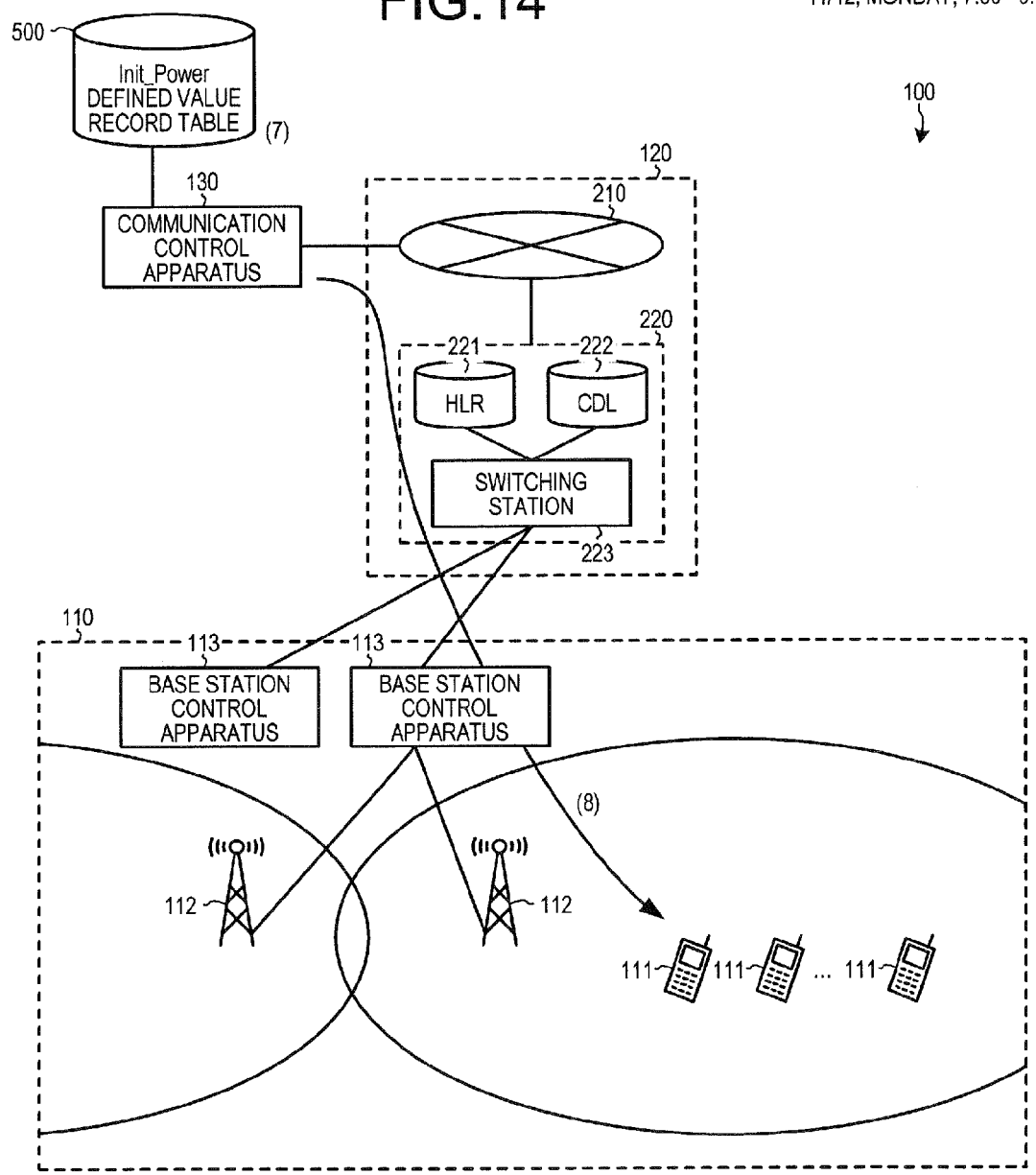

FIGS. 13 and 14 are explanatory diagrams of a specific example of the operation example 2 of the communication control apparatus 130. In FIG. 13, (5) the switching station 223 currently communicates with the mobile station 111 as depicted in FIG. 9 from "7:00 to 9:00" on "Monday" on "November 5th", and stores in the CDL 222 the number of pages from the switching station 223 and the number of requests and Acks transmitted from the mobile station 111.

(6) The communication control apparatus 130 acquires from the switching station 223, the number of pages from the switching station 223 and the number of requests and Acks transmitted from the mobile station 111 from "7:00 to 9:00" on "Monday" on "November 5th", stored in the CDL 222. The communication control apparatus 130 calculates a Ack rate α of "70%" as the information indicating the degree of congestion from "7:00 to 9:00" on "Monday" on "November 5th" and thereby, estimates the Ack rate one week thereafter for the time from "7:00 to 9:00" on "Monday" on "November 12th" to be "70%".

The communication control apparatus 130 refers to the Init_Power defined value table 400; acquires the value of "15 dBm" of the Init_Power field that corresponds to the Ack rate field that includes the Ack rate of "70%"; and thus, is able to identify an Init_Power of "15 dBm" to be included in the setting request to be transmitted to the mobile station 111 one week thereafter for the time from "7:00 to 9:00" on "Monday" on "November 12th".

The communication control apparatus 130 adds a record that correlates "7:00 to 9:00" on "Monday" on "November 12th" with the Init_Power of "15 dBm" and also adds a record for each of the other times of day, to the Init_Power defined value record table 500. The description will progress to that with reference to FIG. 14.

In FIG. 14, (7) the communication control apparatus 130 detects that the time "7:00 to 9:00" on "Monday" on "November 12th" has arrived, refers to the Init_Power defined value record table 500, and acquires the Init_Power of "15 dBm" that corresponds to "7:00 to 9:00" on "Monday" on "November 12th".

(8) The communication control apparatus 130 transmits to the base station control apparatus 113, a setting request that includes the acquired Init_Power of "15 dBm" and the base station control apparatus 113 controls the base station 112 to transmit the setting request to the mobile station 111 that is in the communication coverage area. The mobile station 111 receives the setting request, substitutes the Init_Power included into the setting request in Eq. (1), and thereby, sets the initial value of the transmission power.

Thus, the communication control apparatus 130 can cause the mobile station 111 to set the initial value to be greater as the degree of congestion of the congestion state of the uplink communication increases. As a result, the communication control apparatus 130 is able to reduce the number of transmissions of the radio waves from the mobile station 111 to the base station 112, to suppress the congestion of the uplink communication of the base station 112, and to reduce the noise floor at the base station 112 by suppressing the interference among the radio waves. The communication control apparatus 130 is able to reduce the number of transmissions of the radio waves from the mobile station 111 to the base station 112 and to reduce the power consumption of the mobile station 111.

The communication control apparatus 130 refers to the Init_Power defined value record table 500 that is generated in advance, transmits the setting request to the mobile station 111 and therefore, is able to reduce the time period necessary for the process of determining the congestion state of the uplink communication of the base station 112, and to operate at a high speed. The communication control apparatus 130 refers to the Init_Power defined value record table 500 that is generated in advance and transmits the setting request to the mobile station 111 and therefore, is able to prevent any congestion before the uplink communication of the base station 112 begins to suffer congestion.

For example, during a time of day when plural mobile stations 111 establish connections with the base station 112 such as rush hour during commuting, the communication control apparatus 130 is able to suppress congestion of the uplink communication of the base station 112. During a time of day when an event is held at a stadium or a concert hall or when people pay their first visits to a nearby shrine, the communication control apparatus 130 can suppress congestion of the uplink communication of the base station 112.

An example of a procedure for a record setting process by the communication control apparatus 130 will be described with reference to FIGS. 15 and 16. The record setting process by the communication control apparatus 130 is also a process corresponding to the operation example 2 and includes a generation process of generating the Init_Power defined value record table 500 and a setting process of causing the mobile station 111 to set the initial value of the transmission power.

With reference to FIG. 15, the generation process for the communication control apparatus 130 to generate the Init_Power defined value record table 500 will be described. With reference to FIG. 16, the setting process for the communication control apparatus 130 to refer to the Init_Power defined value record table 500 generated according to the generation process depicted in FIG. 15 and cause the mobile station 111 to set the initial value of the transmission power, will be described.

FIG. 15 is a flowchart of an example of a procedure for the generation process by the communication control apparatus 130. As depicted in FIG. 15, the communication control apparatus 130 determines whether the communication control apparatus 130 has received a start instruction for the generation process (step S1501). If the communication control apparatus 130 determines that the communication control apparatus 130 has been received no start instruction for the generation process (step S1501: NO), the communication control apparatus 130 returns to the process at step S1501.

On the other hand, if the communication control apparatus 130 determines that the communication control apparatus 130 has received a start instruction for the generation process (step S1501: YES), the communication control apparatus 130 acquires the consecutive execution setting information (step S1502). The "consecutive execution setting information" is, for example, information indicating whether the generation process is to be executed consecutively, and is stored in the storage area such as the RAM 303. The communication control apparatus 130 acquires the data in the CDL 222 (step S1503) and calculates the Ack rate α (step S1504).

The communication control apparatus 130 refers to the Init_Power defined value table 400; acquires the Init_Power that corresponds to the Ack rate α (step S1505); refers to the Init_Power; and generates the Init_Power defined value record table 500 (step S1506).

The communication control apparatus 130 refers to the consecutive execution setting information and determines whether the generation process is to be executed consecutively (step S1507). If the communication control apparatus 130 determines that the generation process is to be executed consecutively (step S1507: YES), the communication control apparatus 130 returns to the process at step S1502.

On the other hand, if the communication control apparatus 130 determines that the generation process is not to be executed consecutively (step S1507: NO), the communication control apparatus 130 causes the generation process to come to an end. Thus, the communication control apparatus 130 can generate the Init_Power defined value record table 500.

FIG. 16 is a flowchart of an example of a procedure for the setting process by the communication control apparatus 130. As depicted in FIG. 16, the communication control apparatus 130 determines whether the communication control apparatus 130 has received a start instruction for the setting process (step S1601). If the communication control apparatus 130 determines that the communication control apparatus 130 has received no start instruction for the setting process (step S1601: NO), the communication control apparatus 130 returns to the process at step S1601.

On the other hand, if the communication control apparatus 130 determines that the communication control apparatus 130 has received a start instruction for the setting process (step S1601: YES), the communication control apparatus 130 acquires the consecutive execution setting information (step S1602), stands by for X seconds based on the "Timer" (step S1603), refers to the Init_Power defined value record table 500, and acquires the Init_Power that corresponds to the current time of day (step S1604).

The communication control apparatus 130 determines whether the communication control apparatus 130 can acquire the Init_Power (step S1605). If the communication control apparatus 130 determines that the communication control apparatus 130 cannot acquire the Init_Power (step S1605: NO), the communication control apparatus 130 returns to the process at step S1602.

On the other hand, if the communication control apparatus 130 determines that the communication control apparatus 130 can acquire the Init_Power (step S1605: YES), the communication control apparatus 130 transmits to the mobile station 111, the setting request that includes the Init_Power (step S1606).

The communication control apparatus 130 refers to the consecutive execution setting information and determines whether the setting process is to be executed consecutively (step S1607). If the communication control apparatus 130 determines that the setting process is to be executed consecutively (step S1607: YES), the communication control apparatus 130 returns to the process at step S1602.

On the other hand, if the communication control apparatus 130 determines that the setting process is not to be executed consecutively (step S1607: NO), the communication control apparatus 130 causes the setting process to come to an end.

Thus, the communication control apparatus 130 can cause the mobile station 111 to set the initial value of the transmission power.

As described, the communication control apparatus 130 disclosed herein determines the congestion state of the uplink communication of the base station 112 and causes the mobile station 111 to set the initial value of the transmission power to be greater as the congestion becomes heavier. Thus, the communication control apparatus 130 disclosed herein can cause the mobile station 111 to set a greater value to be the initial value as the degree of congestion of the congestion state of the uplink communication increases.

As a result, the communication control apparatus 130 disclosed herein is able to reduce the number of transmissions of the radio waves from the mobile station 111 to the base station 112 and to suppress the congestion of the uplink communication of the base station 112. The communication control apparatus 130 disclosed herein is able to reduce the number of transmissions of the radio waves from the mobile station 111 to the base station 112 and to reduce the noise floor at the base station 112 by suppressing the interference among the radio waves.

The communication control apparatus 130 disclosed herein is able to reduce the number of transmissions of the radio waves from the mobile station 111 to the base station 112 and to reduce the power consumption of the mobile station 111. The communication control apparatus 130 disclosed herein is able to reduce the number of transmissions of the radio waves from the mobile station 111 to the base station 112 and to reduce the time period necessary for successful establishment of a connection with the base station 112.

The communication control apparatus 130 disclosed herein stores the time of day correlated with the values to be set by the mobile station 111 as the initial value of the transmission power, and causes the mobile station 111 to set the value that corresponds to the time of day as the initial value of the transmission power when a given time of day arrives. Thus, the communication control apparatus 130 disclosed herein can cause the mobile station 111 to set the initial value to be greater as the degree of congestion of the congestion state of the uplink communication at the current time of day increases.

As a result, the communication control apparatus 130 disclosed herein is able to reduce the number of transmissions of the radio waves from the mobile station 111 to the base station 112 and to suppress the congestion of the uplink communication of the base station 112. The communication control apparatus 130 disclosed herein is able to reduce the number of transmissions of the radio waves from the mobile station 111 to the base station 112 and to reduce the noise floor at the base station 112 by suppressing the interference among the radio waves.

The communication control apparatus 130 disclosed herein is able to reduce the number of transmissions of the radio waves from the mobile station 111 to the base station 112 and to reduce the power consumption of the mobile station 111. The communication control apparatus 130 disclosed herein is able to reduce the number of transmissions of the radio waves from the mobile station 111 to the base station 112 and to reduce the time period necessary for successful establishment of a connection with the base station 112.

The communication control apparatus 130 disclosed herein determines the congestion state of uplink communication of the base station 112 for each time of day and determines the value to be set by the mobile station 111 as the initial value of the transmission power for a later time of day. Thus, the communication control apparatus 130 disclosed herein can automatically store the time of day correlated with values to be set by the mobile station 111 as the initial value of the transmission power for a given time of day.

For example, a configuration can be considered to increase the base stations 112 and thereby, distribute the communication load, and suppress the congestion of the uplink communication of the base stations 112. However, in this case, cost increases due to the increase of the base stations 112. In contrast, in this embodiment, the base stations 112 do not need to be increased and increases in cost can be suppressed.

For example, another configuration can be considered for a manager of the base station 112 to monitor the congestion state of the uplink communication of the base station 112 and when the base station 112 suffers congestion, transmit a setting request to the mobile station 111 in the communication coverage area of the base station 112. However, in this case, the work load on the manager may be increased and the base station 112 may suffer even heavier congestion consequent to a mistake made by the manager. In contrast, the communication control apparatus 130 disclosed herein automatically transmits the setting request to the mobile station 111 that is in the communication coverage area of the base station 112 and therefore, the work load on the manager may be reduced and any degradation of the congestion state due to a mistake made by the manager may be prevented.

For example, a configuration can be considered for the conventional mobile station to start up a random timer and when the random timer times out, to attempt to establish a connection with the base station 112. However, uplink communication of the base station 112 may suffer congestion for a long time such as during rush hour for commuting. In this case, it is difficult for the conventional mobile station to establish a connection with the base station 112 because uplink communication of the base station 112 continuously suffers congestion even when the conventional mobile station shifts the timing to attempt to establish a connection with the base station 112 based on the random timer.

As a result, the conventional mobile station increases the time period necessary for successfully establishing a connection with the base station 112; also increases the time period for noises to be generated; and may cause inconvenience to the user of the conventional mobile station because no telephone call and no e-mail can arrive at the conventional mobile station until the connection with the base station 112 can successfully be established.

In contrast, the communication control apparatus 130 disclosed herein causes the mobile station 111 to set the initial value of the transmission power to be greater as the uplink communication of the base station 112 suffers heavier congestion. Thus, the communication control apparatus 130 disclosed herein is able to reduce the number of transmissions of the radio waves from the mobile station 111 to the base station 112 and to suppress the congestion of the uplink communication of the base station 112. The communication control apparatus 130 disclosed herein is able to reduce the number of transmissions of the radio waves from the mobile station 111 to the base station 112 and to reduce the time period necessary for successfully establishing a connection with the base station 112.

Another configuration can be considered for the conventional mobile station to set the transmission power to be greater when the intensity of the radio wave received from the base station 112 is less than or equal to the threshold value. However, in this case, the congestion of the uplink communication of the base station 112 cannot be suppressed if the intensity of the radio wave received from the base station 112 by the conventional mobile station is higher than a threshold value while the uplink communication of the base station 112 suffers congestion.

In contrast, the communication control apparatus 130 disclosed herein causes the mobile station 111 to set the initial value of the transmission power to be a greater values as the uplink communication of the base station 112 suffers heavier congestion. Thus, the communication control apparatus 130 disclosed herein is able to suppress the congestion of the uplink communication of the base station 112 when the intensity of the radio wave at the mobile station 111 received from the base station 112 is higher than the threshold value while the uplink communication of the base station 112 suffers the congestion.

Another configuration can be considered for the switching station 223 to refer to the operation information database of a transport facility and to change the location registration area of the conventional mobile stations loaded on the transport facility, when the time for the transport facility to pass through the border between the location registration areas arrives. However, in this case, the congestion of the uplink communication of the base station 112 cannot be suppressed when the plural conventional mobile stations respectively attempt to establish connection with the base station 112 for a reason other than the registration of the location registration area.

When the reason why the uplink communication of the base station 112 suffers congestion is other than that the plural conventional mobile stations are carried by a transport facility, the congestion of the uplink communication of the base station 112 cannot be suppressed. When the operation of the transport facility is confused, the conventional mobile stations may be unable to receive telephone calls and e-mail because the location registration area of the conventional mobile stations registered in the switching station 223 and the location registration area actually having the conventional mobile stations present therein differ.

In contrast, the communication control apparatus 130 disclosed herein causes the mobile station 111 to set a greater value to be the initial value of the transmission power as the uplink communication of the base station 112 suffers heavier congestion. Thus, the communication control apparatus 130 disclosed herein is able to suppress congestion of uplink communication at the base station 112 even when the plural conventional mobile stations attempt to establish connection with the base station 112 for a reason other than the registration of the location registration area. The communication control apparatus 130 disclosed herein can suppress the congestion of the uplink communication of the base station 112 even when the cause of the congestion of the uplink communication of the base station 112 is other than that the plural conventional mobile stations are carried by the transport facility.

The mobile station 111 disclosed herein sets the initial value of the transmission power according to the control of the communication control apparatus 130 disclosed herein and thereafter, requests location registration to the switching station 223 using the identifier of the location registration area having the mobile station 111 disclosed herein actually present therein. Therefore, the mobile station 111 disclosed herein is able to prevent differences from occurring between the location registration area of the mobile station 111 registered in the switching station 223 and the location registration area actually having the mobile station 111 present therein, and is able to receive telephone calls and e-mail.

According to an aspect of an embodiment, an effect is achieved in that communication congestion can be suppressed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication control apparatus comprising
a processor that is configured to:
    determine a congestion state of uplink communication of a base station; and
    cause a mobile station that attempts to establish connection to the base station while increasing transmission power stepwise from an initial value, to set the initial value to be a first value, upon determining the congestion state to be a first congestion state and to set the initial value to be a second value that is greater than the first value, upon determining the congestion state to be a second congestion state that is heavier than the first congestion state.

2. The communication control apparatus according to claim 1, wherein
the processor determines which one among three or more congestion states, the congestion state of the uplink communication is, and
the processor causes the mobile station to set the initial value to be a greater value as a degree of congestion of the congestion state determined by the processor increases.

3. The communication control apparatus according to claim 1, wherein
the processor causes the mobile station to set the initial value by transmitting to the mobile station, a setting request that includes a parameter for the mobile station to determine the initial value.

4. The communication control apparatus according to claim 1, wherein
the processor causes the mobile station to set the initial value of the transmission power to be the second value and after a predetermined time period elapses, causes the mobile station to set the initial value to be the first value.

5. The communication control apparatus according to claim 1, wherein
the processor is configured to:
    acquire correlation information that correlates a first value of transmission power with a first time of day, and a second value that is greater than the first value with a second time of day that is different from the first time of day; and
    refer to the acquired correlation information, and cause a mobile station that attempts to establish connection to a base station while increasing the transmission power stepwise from an initial value, to set the initial value to be a value that corresponds to a current time of day.

6. The communication control apparatus according to claim 5, wherein
the first time of day is a time of day during which a state of uplink communication of the base station is a first congestion state, and
the second time of day is a time of day during which the state of the uplink communication is a second congestion state that is heavier than the first congestion state.

7. The communication control apparatus according to claim 5, wherein
the processor is further configured to
    acquire information that indicates degrees of congestion of the uplink communication for plural times of days, and generate based on the acquired information, correlation information that correlates each time of day with a value that is set to be greater, the greater the degree of congestion of the uplink communication is,
the communication control apparatus further comprises
    a storage unit that stores the generated correlation information, and
the processor refers to the correlation information stored in the storage unit and causes the mobile station to set the initial value of the transmission power to be an initial value that corresponds to the current time of day.

8. A mobile station comprising
a processor that is configured to:
    attempt to establish connection to a base station while increasing transmission power stepwise from an initial value;
    determine a congestion state of uplink communication of the base station and set according to control by a communication control apparatus, the initial value to be a first value upon determining the congestion state to be a first congestion state and to set the initial value to be a second value that is greater than the first value upon determining the congestion state to be a second congestion state that is heavier than the first congestion state.

9. The mobile station according to claim 8, wherein
the processor is configured to:
    attempt to establish connection to a base station while increasing transmission power stepwise from an initial value; and
    refer to correlation information that correlates a first value of the transmission power with a first time of day, and a second value that is greater than the first value with a second time of day that is different from the first time of day, and set according to control by a communication control apparatus, the initial value to be a value that corresponds to a current time of day.

10. A communication system comprising:
a mobile station configured to attempt to establish connection to a base station while increasing transmission power stepwise from an initial value; and
a communication control apparatus configured to determine a congestion state of uplink communication of the base station, cause the mobile station to set the initial value to be a first value upon determining the congestion state to be a first congestion state and to set the initial value to be a second value that is greater than the first value upon determining the congestion state to be a second congestion state that is heavier than the first congestion state.

11. The communication system according to claim 10, wherein:
- the mobile station is configured to attempt to establish communication to a base station while increasing transmission power stepwise from an initial value; and
- the communication control apparatus is configured to refer to correlation information that correlates a first value of the transmission power with a first time of day and a second value that is greater than the first value with a second time of day that is different from the first time of day, and cause the mobile station to set the initial value to be a value that corresponds to a current time of day.

\* \* \* \* \*